March 15, 1932. J. M. COOTE 1,849,074
VOLTMETER DESIGNED TO INDICATE THE CHARGE
CONDITION OF A STORAGE BATTERY
Filed July 23, 1928
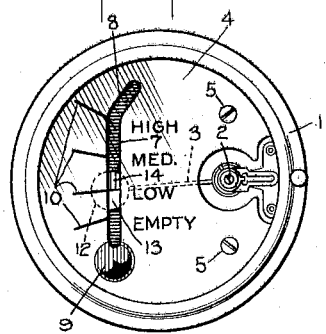
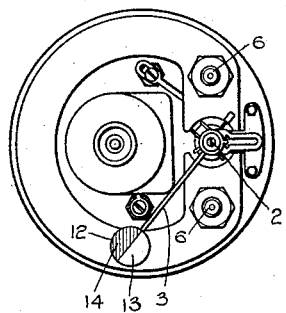

Patented Mar. 15, 1932

1,849,074

UNITED STATES PATENT OFFICE

JOHN M. COOTE, OF NEW YORK, N. Y., ASSIGNOR OF ONE-HALF TO HENRY J. LUCKE, OF NEW YORK, N. Y.

VOLTMETER DESIGNED TO INDICATE THE CHARGE CONDITION OF A STORAGE BATTERY

Application filed July 23, 1928. Serial No. 294,720.

My invention relates to a voltmeter especially designed to indicate the charge condition of a storage battery.

The principal objects are to provide a meter whose total range of indication is equivalent to the range of voltage variations of a storage battery from discharged to fully charged condition, and at the same time to provide a dial and movable indicator of novel characteristics, having an approximate resemblance to a thermometer or hydrometer, or a similar battery solution specific gravity indicator, and which also gives direct indications or "readings" of the battery charge condition.

To attain these and other objects the invention as herein embodied includes any known or suitable voltmeter mechanism, including the usual movable indicator or needle and designed or arranged to have a total range equivalent to the voltage variations of a storage battery; thus for use with lead-and-acid batteries the meter will have an indication range from approximately 5.5 V. to 6 V., this voltage range being determined either by the internal resistance of the instrument, by use of series resistance, or in any other practical way. The voltmeter mechanism is enclosed in a case as usual, and the dial is placed in the case above the needle. This dial is of special design, including a slot having at one end thereof the representation of a bulb similar to a hydrometer float bulb. The slot is calibrated by means of marks on the dial and is provided with suitable legends indicating battery charge condition. To cooperate with such a dial and slot the movable indicator or needle is provided with a target which moves below the slot and may have differently colored segments, to give an appearance somewhat analogous to the position of a hydrometer float or of a column of liquid in a thermometer or barometer. By the use of suitable explanatory legends on the dial, such as "Empty", "Low", "Medium" and "High" and an indicator or target of the character described in connection with a slot, any unskilled user of a storage battery by making suitable connections to the battery may immediately determine the charge condition and the necessity for any further charge or discontinuation of charging, without having to concern himself with voltage readings and also without the annoyance of taking hydrometer readings of the separate cells, with the accompanying nuisance of dripping solution and other objections well understood by persons skilled in this art.

The characteristics and advantages of the invention are further sufficiently explained in connection with the following detail description of the accompanying drawings, which illustrate one representative embodiment. After considering this example, skilled persons will understand that many variations may be made without departing from the principles involved, and I contemplate the employment of any structures that are properly within the scope of the appended claims.

Fig. 1 is a plan view of an instrument embodying the invention in one form.

Fig. 2 is a similar view with the dial removed.

A case 1 contains any suitable voltmeter mechanism, including an indicator pivot 2 and indicator in the form of a needle 3. The meter is arranged or adjusted in any of the ways above mentioned to have a total range of movement corresponding to storage battery voltage variations; that is, the range from fully discharged to fully charged condition of the storage battery.

The dial 4 is located above the indicator and secured as usual, as by screws 5 to pillars 6, Fig. 2. The dial has a slot 7, the location and arrangement of which may vary, but preferably the slot is generally tangent to the arc of movement of the indicator needle; or as otherwise stated, is arranged substantially as a sector of that arc. Since the slot is usually of considerable length and the movement of the indicator proper (later referred to) is arcuate, it is sometimes desirable to form the end portion of the slot 8 at an angle to the major part of the slot, thus making the slot as a whole conform approximately to the arcuate movement of the indicator.

A representation 9 of a bulb, similar to a hydrometer float bulb, is provided on the dial at one end of the slot, usually the low-reading end of the slot, this desirably being accomplished by pressing the thin sheet metal of the dial convexly outward and coloring the outer surface red, or any other suitable distinctive color in contrast with the dial face, which is usually white. The dial is provided with calibrations adjacent the slot, such as the short lines 10, which are desirably arranged at one side of the slot and substantially radial to the needle pivot 2.

To co-operate with the dial and slot, the indicator proper consists of a small target 12 secured on the end of the needle 3. This target may be of any suitable color, usually contrasting with the dial. Thus, if the dial is white, the target may be red, and this is also in accordance with the preferred coloration of bulb 9. Otherwise, and more desirably in some cases, the target face consists of two semi-circular segments 13 and 14, differently colored. Thus the segment 13 may be white to correspond with the dial coloration and segment 14 may be red to agree with the coloration of bulb 9. The line dividing the target segments is desirably radial to the needle pivot, so that in any position of the target this division line will be aligned with one of the calibrations 10, or substantially parallel thereto.

Fig. 1 shows one position of the indicator target when the instrument is in use, in this instance denoting a low-charge condition of the battery. It will be seen that the division line of the target segments is aligned with the calibration opposite the word "Low" on the dial. The red segment 14 of the target, therefore, appears in a position to forcefully indicate to the user the battery charge condition, while the white segment 13, of the same coloration as the dial, has the effect of eliminating that target section from attention and directing the user's attention to the target division line, which gives the true indication or reading of battery condition. For the higher voltage indication corresponding substantially to the calibration and legend "High" on the dial, the target, or at least the red segment thereof, appears in the angularly disposed slot portion 8, which thus accommodates the arcuate swing of the target at the upper end of the indication range.

I claim:

1. A dial for a voltmeter adapted to indicate the voltage variations in a storage battery from a fully charged to a full discharged condition, provided with an elongated slot terminating in a substantially circular opening through said dial to simulate the appearance of a hydrometer and related to the indicating element of the voltmeter so that the indicating element may be seen through said slot or circular opening.

2. A dial for a voltmeter adapted to indicate the voltage variations in a storage battery from a fully charged to a fully discharged condition, provided with an elongated slot terminating in a substantially circular opening through said dial to simulate the appearance of a hydrometer and related to the indicating element of the voltmeter so that the indicating element may be seen through said slot or circular opening, and said dial also bearing legends descriptive of battery charge conditions and arranged adjacent to the slot and substantially alined with corresponding calibration marks.

3. In a device of the character described, a dial provided with an elongated slot terminating in a substantially circular opening and an indicating pointer having a circular disc mounted on the outer end thereof, said disc being so positioned relative to the slot as to be visible therethrough in all angular positions of the pointer.

4. In a device of the character described, a dial provided with an elongated slot terminating in a substantially circular opening, said dial bearing legends descriptive of battery charge conditions and arranged adjacent to the slot and substantially aligned with corresponding calibration marks and an indicating pointer having a circular disc mounted on the outer end thereof, said disc being so positioned relative to the slot as to be visible therethrough in all angular positions of the pointer.

5. In a device of the character described, a dial provided with an elongated substantially straight slot and an indicating pointer having a circular disc mounted on the outer end thereof and so related to said slot as to be visible therethrough in all angular positions of said pointer.

6. In a device of the character described, a dial provided with an elongated substantially straight slot terminating in a circular opening, and an indicating pointer having a circular disc mounted on the outer end thereof and so related to said slot as to be visible therethrough in all angular positions of said pointer, said disc bearing contrasting colors joined on a line substantially normal to the longitudinal axis of said slot.

7. In a device of the character described, a dial provided with an elongated vertical slot terminating in a substantially circular opening and an indicating pointer having a circular disc mounted on the outer end thereof and so related to said slot as to be visible therethrough in all angular positions of said pointer, said disc bearing contrasting colors joined on a line substantially normal to the longitudinal axis of said slot.

In testimony whereof I have signed this specification this 1st day of February, 1928.

JOHN M. COOTE.